(12) United States Patent
Gilliland et al.

(10) Patent No.: US 7,090,509 B1
(45) Date of Patent: Aug. 15, 2006

(54) MULTI-PORT PLUGGABLE TRANSCEIVER (MPPT) WITH MULTIPLE LC DUPLEX OPTICAL RECEPTACLES

(75) Inventors: Patrick B. Gilliland, Chicago, IL (US); Carlos Jines, Forest Park, IL (US); Raul Medina, Chicago, IL (US); James W. McGinley, Barrington, IL (US)

(73) Assignee: Stratos International, Inc., Chicago, IL (US)

( * ) Notice: Subject to any disclaimer, the term of this patent is extended or adjusted under 35 U.S.C. 154(b) by 646 days.

(21) Appl. No.: 09/330,290

(22) Filed: Jun. 11, 1999

(51) Int. Cl.
*G02B 6/42* (2006.01)

(52) U.S. Cl. ...................... 439/76.1; 385/92
(58) Field of Classification Search ............... 385/88, 385/89, 92; 439/76.1, 297, 607, 680, 681
See application file for complete search history.

(56) References Cited

U.S. PATENT DOCUMENTS

| | | | |
|---|---|---|---|
| 2,899,669 A | 8/1959 | Johanson .................... 339/45 |
| 3,264,601 A | 8/1966 | Hartholz .................... 339/176 |
| 3,332,860 A | 7/1967 | Diebold et al. | |
| 3,474,380 A | 10/1969 | Miller ........................ 339/17 |
| 3,497,866 A | 2/1970 | Patton, Jr. .................. 339/176 |
| 3,670,290 A | 6/1972 | Angele et al. ................ 339/75 |
| 3,673,545 A | 6/1972 | Rundle ...................... 339/156 |
| 3,737,729 A | 6/1973 | Carney ................. 317/101 PH |
| 3,792,284 A | 2/1974 | Kaelin ........................ 250/551 |
| 3,805,116 A | 4/1974 | Nehmann .................... 317/99 |
| 3,809,908 A | 5/1974 | Clanton ...................... 250/217 |
| 3,976,877 A | 8/1976 | Thillays ...................... 250/227 |
| 3,990,761 A | 11/1976 | Jayne ........................ 339/74 R |
| 4,149,072 A | 4/1979 | Smith et al. ................ 250/199 |
| 4,156,903 A | 5/1979 | Barton et al. ............. 340/172.5 |
| 4,161,650 A | 7/1979 | Caoutte et al. ............. 250/199 |
| 4,176,897 A | 12/1979 | Cameron ..................... 339/40 |
| 4,217,488 A | 8/1980 | Hubbard ..................... 455/612 |
| 4,226,491 A | 10/1980 | Kazoma et al. ........ 339/17 LM |
| 4,234,968 A | 11/1980 | Singh ......................... 455/607 |
| 4,249,266 A | 2/1981 | Nakamori ................... 455/608 |
| 4,252,402 A | 2/1981 | Puech et al. ............. 350/96.14 |
| 4,257,124 A | 3/1981 | Porter et al. ................ 455/601 |
| 4,273,413 A | 6/1981 | Bendiksen et al. ........ 350/96.2 |
| 4,276,656 A | 6/1981 | Petruk, Jr. .................. 455/608 |

(Continued)

FOREIGN PATENT DOCUMENTS

EP 0 228 278 12/1986

(Continued)

OTHER PUBLICATIONS

AMP "PC Board Connectors" Product Catalog 82759 published Jun. 1991.

(Continued)

*Primary Examiner*—Neil Abrams
(74) *Attorney, Agent, or Firm*—Karl D. Kovach

(57) ABSTRACT

An interface converter module includes a metallized housing having a first end and a second end. A printed circuit board is mounted within the housing and has mounted thereon electronic circuitry configured to convert data signals from a host device transmission medium to the second transmission medium. The printed circuit board has not more than twenty contact fingers adhered at one end in order to form a host connector, a media connector is at the other end of the module. The media end having a dual LC duplex optical receptacle, where each duplex portion of the dual LC duplex optical receptacle houses a ROSA and a TOSA. The module and receiver may include interengaging rails and slots and/or keys and keyways to ensure correct matching of modules and receptacles.

2 Claims, 5 Drawing Sheets

U.S. PATENT DOCUMENTS

| | | | |
|---|---|---|---|
| 4,330,870 A | 5/1982 | Arends | 455/617 |
| 4,347,655 A | 9/1982 | Zory et al. | 29/589 |
| 4,357,606 A | 11/1982 | Fortescue | 340/870.01 |
| 4,360,248 A | 11/1982 | Bickel et al. | 350/96.16 |
| 4,366,565 A | 12/1982 | Herskowitz | 370/1 |
| 4,369,494 A | 1/1983 | Bienvenu et al. | 364/200 |
| 4,380,360 A | 4/1983 | Parmer et al. | 339/17 CF |
| 4,388,671 A * | 6/1983 | Hall et al. | 361/740 |
| 4,393,516 A | 7/1983 | Itani | 455/608 |
| 4,399,563 A | 8/1983 | Greenberg | 455/607 |
| 4,408,273 A | 10/1983 | Plow | 364/200 |
| 4,422,088 A | 12/1983 | Gfeller | 357/19 |
| 4,427,879 A | 1/1984 | Becher et al. | 250/215 |
| 4,430,699 A | 2/1984 | Segarra et al. | 364/200 |
| 4,432,604 A | 2/1984 | Schwab | 350/96.21 |
| 4,437,190 A | 3/1984 | Rozenwaig et al. | 455/600 |
| 4,446,515 A | 5/1984 | Sauer et al. | 364/200 |
| 4,449,244 A | 5/1984 | Kopainsky | 455/603 |
| 4,453,903 A | 6/1984 | Pukoite | 425/117 |
| 4,459,658 A | 7/1984 | Gabbe et al. | 364/200 |
| 4,461,537 A | 7/1984 | Raymer, II et al. | 350/96.2 |
| 4,470,154 A | 9/1984 | Yano | 455/607 |
| 4,486,059 A | 12/1984 | DeYoung | 339/14 R |
| 4,493,113 A | 1/1985 | Forrest et al. | 455/606 |
| 4,501,021 A | 2/1985 | Weizzq | 455/601 |
| 4,506,937 A | 3/1985 | Cosmos et al. | 339/14 R |
| 4,510,553 A | 4/1985 | Faultersack | 361/413 |
| 4,511,207 A | 4/1985 | Newton et al. | 350/96.15 |
| 4,514,586 A | 4/1985 | Waggoner | 174/35 |
| 4,516,204 A | 5/1985 | Sauer et al. | 364/200 |
| 4,519,670 A | 5/1985 | Spinner et al. | 350/96.15 |
| 4,519,672 A | 5/1985 | Rogstadius | 350/96.2 |
| 4,519,673 A | 5/1985 | Hamilton | 350/96.32 |
| 4,522,463 A | 6/1985 | Schwenda et al. | 350/96.21 |
| 4,526,438 A | 7/1985 | Essert | 350/96.2 |
| 4,526,986 A | 7/1985 | Fields et al. | 549/254 |
| 4,527,286 A | 7/1985 | Haworth | 455/601 |
| 4,529,266 A | 7/1985 | Delebecque | 350/96.23 |
| 4,530,566 A | 7/1985 | Smith et al. | 350/96.2 |
| 4,531,810 A | 7/1985 | Carlsen | 350/96.2 |
| 4,533,208 A | 8/1985 | Stowe | 350/96.16 |
| 4,533,209 A | 8/1985 | Segerson et al. | 364/200 |
| 4,533,813 A | 8/1985 | Rayburn et al. | 219/121 LH |
| 4,534,616 A | 8/1985 | Bowen et al. | 350/96.2 |
| 4,534,617 A | 8/1985 | Klootz et al. | 350/96.2 |
| 4,535,233 A | 8/1985 | Abraham | 250/214 |
| 4,537,468 A | 8/1985 | Begoix et al. | 350/96.21 |
| 4,539,476 A | 9/1985 | Donuma et al. | 250/227 |
| 4,540,237 A | 9/1985 | Winzer | 350/96.15 |
| 4,540,246 A | 9/1985 | Fantone | 350/514 |
| 4,541,685 A | 9/1985 | Anderson | 350/96.21 |
| 4,542,076 A | 9/1985 | Bednarz et al. | 428/624 |
| 4,544,231 A | 10/1985 | Peterson | 350/96.15 |
| 4,544,233 A | 10/1985 | Iwamoto et al. | 350/96.2 |
| 4,544,234 A | 10/1985 | DeVeau, Jr. et al. | 350/96.21 |
| 4,545,074 A | 10/1985 | Balliet et al. | 455/601 |
| 4,545,077 A | 10/1985 | Drapala et al. | 455/612 |
| 4,545,642 A | 10/1985 | Auracher et al. | 350/96.19 |
| 4,545,643 A | 10/1985 | Young et al. | 350/96.2 |
| 4,545,644 A | 10/1985 | DeVeau, Jr. et al. | 350/96.21 |
| 4,545,645 A | 10/1985 | Mignien | 350/96.21 |
| 4,548,465 A | 10/1985 | White | 350/96.2 |
| 4,548,466 A | 10/1985 | Evans et al. | 350/96.2 |
| 4,548,467 A | 10/1985 | Stoerk et al. | 350/96.21 |
| 4,549,782 A | 10/1985 | Miller | 350/96.16 |
| 4,549,783 A | 10/1985 | Schmachtenberg, III | 350/96.2 |
| 4,550,975 A | 11/1985 | Levinson et al. | 350/96.18 |
| 4,553,811 A | 11/1985 | Becker et al. | 350/96.2 |
| 4,553,814 A | 11/1985 | Bahl et al. | 350/96.21 |
| 4,556,279 A | 12/1985 | Shaw et al. | 350/96.15 |
| 4,556,281 A | 12/1985 | Anderton | 350/96.2 |
| 4,556,282 A | 12/1985 | Delebeque | 350/96.21 |
| 4,557,551 A | 12/1985 | Dyott | 350/96.15 |
| 4,560,234 A | 12/1985 | Shaw et al. | 350/96.15 |
| 4,563,057 A | 1/1986 | Ludman et al. | 350/96.18 |
| 4,566,753 A | 1/1986 | Mannschke | 350/96.16 |
| 4,568,145 A | 2/1986 | Colin | 350/96.2 |
| 4,569,569 A | 2/1986 | Stewart | 350/96.19 |
| 4,573,760 A | 3/1986 | Fan et al. | 350/96.21 |
| 4,580,295 A | 4/1986 | Richman | 455/618 |
| 4,580,872 A | 4/1986 | Bhatt et al. | 350/96.16 |
| 4,588,256 A | 5/1986 | Onstott et al. | 350/96.21 |
| 4,589,728 A | 5/1986 | Dyott et al. | 350/96.3 |
| 4,595,839 A | 6/1986 | Braun et al. | 250/551 |
| 4,597,631 A | 7/1986 | Flores | 350/96.2 |
| 4,612,670 A | 9/1986 | Henderson | 455/607 |
| 4,614,836 A | 9/1986 | Carpenter et al. | 174/51 |
| 4,625,333 A | 11/1986 | Takezawa et al. | 455/612 |
| 4,629,270 A | 12/1986 | Andrews, Jr. et al. | 339/75 |
| 4,634,239 A | 1/1987 | Buhrer | 350/486 |
| 4,647,148 A | 3/1987 | Katagiri | 350/96.2 |
| 4,652,976 A | 3/1987 | Fushimoto | 361/393 |
| 4,663,240 A | 5/1987 | Hajdu et al. | 428/545 |
| 4,663,603 A | 5/1987 | Van Riemskijk et al. | 336/60 |
| 4,678,264 A | 7/1987 | Bowen et al. | 350/96.2 |
| 4,679,883 A | 7/1987 | Assini et al. | 439/607 |
| RE32,502 E | 9/1987 | Kumar | 439/92 |
| 4,695,106 A | 9/1987 | Feldman et al. | 439/83 |
| 4,697,864 A | 10/1987 | Hayes et al. | 439/444 |
| 4,708,433 A | 11/1987 | Kakii et al. | 350/96.22 |
| 4,720,630 A | 1/1988 | Takeuchi et al. | 250/227 |
| 4,722,584 A | 2/1988 | Takii et al. | 350/96.2 |
| 4,727,248 A | 2/1988 | Meur et al. | 250/239 |
| 4,762,388 A | 8/1988 | Tanaka et al. | 350/96.2 |
| 4,772,931 A | 9/1988 | Rogers | 357/30 |
| 4,798,430 A | 1/1989 | Johnson et al. | 350/96.2 |
| 4,807,006 A | 2/1989 | Rogers et al. | 357/30 |
| 4,807,955 A | 2/1989 | Ashman et al. | 350/96.2 |
| 4,811,165 A | 3/1989 | Currier et al. | 361/386 |
| 4,812,133 A | 3/1989 | Fleak et al. | 439/248 |
| 4,840,451 A | 6/1989 | Sampson et al. | |
| 4,844,581 A | 7/1989 | Turner | 350/96.2 |
| 4,847,711 A | 7/1989 | Inoue | 364/431.05 |
| 4,849,944 A | 7/1989 | Matsushita | 371/21 |
| 4,857,002 A | 8/1989 | Jensen et al. | 439/76 |
| 4,881,789 A | 11/1989 | Levinson | 350/96.15 |
| 4,884,336 A | 12/1989 | Waters et al. | 29/845 |
| 4,897,711 A | 1/1990 | Blonder et al. | 357/74 |
| 4,906,197 A | 3/1990 | Noll | 439/79 |
| 4,913,511 A | 4/1990 | Tabalba et al. | 350/96.2 |
| 4,927,225 A | 5/1990 | Levinson | 350/96.18 |
| 4,944,568 A * | 7/1990 | Danbach et al. | 439/246 |
| 4,945,229 A | 7/1990 | Daly et al. | 250/227.11 |
| 4,953,929 A | 9/1990 | Basista et al. | 350/96.2 |
| 4,977,329 A | 12/1990 | Eckhardt et al. | 250/551 |
| 4,979,787 A | 12/1990 | Lichenberger | 350/96.2 |
| 4,986,625 A | 1/1991 | Yamada et al. | 350/96.2 |
| 4,990,104 A | 2/1991 | Schieferly | 439/578 |
| 5,004,434 A | 4/1991 | Aiello et al. | 439/636 |
| 5,005,939 A | 4/1991 | Arvanitakis et al. | 350/96.2 |
| 5,006,286 A | 4/1991 | Dery et al. | 264/40.2 |
| 5,011,246 A | 4/1991 | Corradetti et al. | 350/96.2 |
| 5,011,425 A | 4/1991 | Van Zanten et al. | 439/353 |
| 5,013,247 A | 5/1991 | Watson | 439/55 |
| 5,035,482 A | 7/1991 | Ten Berge et al. | 350/96.2 |
| 5,039,194 A | 8/1991 | Block et al. | 383/88 |
| 5,043,775 A | 8/1991 | Lee | 357/19 |
| 5,045,971 A | 9/1991 | Ono et al. | 361/386 |
| 5,046,955 A | 9/1991 | Olsson | 439/74 |
| 5,060,373 A | 10/1991 | Machura et al. | 29/858 |
| 5,069,522 A * | 12/1991 | Block et al. | 385/39 |
| 5,082,344 A | 1/1992 | Mulholland et al. | 385/60 |
| 5,084,802 A | 1/1992 | Nguyenngoc | 361/424 |
| 5,093,879 A | 3/1992 | Bregman et al. | 385/93 |

| | | | |
|---|---|---|---|
| 5,094,623 A | 3/1992 | Scharf et al. ............... 439/607 |
| 5,099,307 A | 3/1992 | Go et al. ...................... 357/70 |
| 5,101,463 A | 3/1992 | Cubukciyan et al. ......... 385/72 |
| 5,104,243 A | 4/1992 | Harding ....................... 385/84 |
| 5,107,404 A | 4/1992 | Tam ............................ 361/424 |
| 5,108,294 A | 4/1992 | Marsh et al. ................. 439/76 |
| 5,109,453 A | 4/1992 | Edwards et al. ............. 385/90 |
| 5,116,239 A | 5/1992 | Siwinski ..................... 439/497 |
| 5,117,476 A | 5/1992 | Yingst et al. ................. 385/88 |
| 5,118,362 A | 6/1992 | St. Angelo et al. ......... 136/256 |
| 5,120,578 A | 6/1992 | Chen et al. .................. 427/304 |
| 5,122,893 A | 6/1992 | Tolbert ....................... 359/152 |
| 5,125,849 A | 6/1992 | Briggs et al. ............... 439/378 |
| 5,134,677 A | 7/1992 | Leung et al. ................. 385/84 |
| 5,136,152 A | 8/1992 | Lee ............................. 250/211 |
| 5,136,603 A | 8/1992 | Hasnain et al. ............... 372/50 |
| 5,138,537 A | 8/1992 | Wang .......................... 362/187 |
| 5,155,786 A | 10/1992 | Ecker et al. .................. 385/94 |
| 5,168,537 A | 12/1992 | Rajasekharan et al. ....... 385/89 |
| 5,170,146 A | 12/1992 | Gardner ...................... 338/313 |
| 5,183,405 A | 2/1993 | Elicker et al. .............. 439/108 |
| 5,202,943 A | 4/1993 | Carden et al. ................ 385/92 |
| 5,212,752 A | 5/1993 | Stephenson et al. .......... 385/78 |
| 5,234,353 A | 8/1993 | Scholz et al. ............... 439/409 |
| 5,241,614 A | 8/1993 | Ecker et al. .................. 385/94 |
| 5,243,678 A | 9/1993 | Schaffer et al. ............. 385/134 |
| 5,259,054 A | 11/1993 | Benzoni et al. ............... 389/89 |
| 5,271,079 A | 12/1993 | Levinson ..................... 385/46 |
| 5,274,729 A | 12/1993 | King et al. ................. 385/134 |
| 5,280,191 A | 1/1994 | Chang ........................ 257/712 |
| 5,285,466 A | 2/1994 | Tabatabaie .................... 372/50 |
| 5,285,511 A | 2/1994 | Akkapeddi et al. ........... 385/89 |
| 5,285,512 A | 2/1994 | Duncan et al. ............... 385/94 |
| 5,289,345 A | 2/1994 | Corradetti et al. .......... 361/752 |
| 5,295,214 A | 3/1994 | Card et al. .................... 385/92 |
| 5,296,813 A | 3/1994 | Holmes et al. .............. 324/322 |
| 5,304,069 A | 4/1994 | Brunker et al. ............. 439/108 |
| 5,305,182 A | 4/1994 | Chen .......................... 361/684 |
| 5,317,663 A | 5/1994 | Beard et al. .................. 385/70 |
| 5,321,819 A | 6/1994 | Szczepanek ................. 395/325 |
| 5,325,455 A * | 6/1994 | Henson et al. ................ 385/88 |
| 5,329,428 A | 7/1994 | Block et al. ................. 361/785 |
| 5,329,604 A | 7/1994 | Baldwin et al. .............. 385/92 |
| 5,333,225 A | 7/1994 | Jacobowitz et al. .......... 385/93 |
| 5,335,301 A * | 8/1994 | Newman et al. .............. 385/75 |
| 5,337,391 A | 8/1994 | Lebby ......................... 385/88 |
| 5,337,396 A | 8/1994 | Chen et al. ................... 385/92 |
| 5,337,398 A | 8/1994 | Benzoni et al. ............... 385/90 |
| 5,345,524 A | 9/1994 | Lebby et al. ................. 385/88 |
| 5,345,530 A | 9/1994 | Lebby et al. ................. 385/88 |
| 5,356,300 A | 10/1994 | Costello et al. ............. 439/101 |
| 5,357,402 A | 10/1994 | Anhalt |
| 5,361,244 A | 11/1994 | Nakamura et al. ........ 369/44.23 |
| 5,366,664 A | 11/1994 | Varadan et al. .............. 252/512 |
| 5,375,040 A | 12/1994 | Cooper et al. ............... 361/730 |
| 5,397,242 A | 3/1995 | Laisne et al. ................ 439/101 |
| 5,414,787 A | 5/1995 | Kurata ......................... 385/92 |
| 5,416,668 A | 5/1995 | Benzoni ...................... 361/816 |
| 5,416,870 A | 5/1995 | Chun et al. ................... 385/88 |
| 5,416,871 A | 5/1995 | Takahashi et al. ............ 385/88 |
| 5,416,872 A | 5/1995 | Sizer, II et al. .............. 385/92 |
| 5,428,704 A | 6/1995 | Lebby et al. ................. 385/92 |
| 5,432,630 A | 7/1995 | Lebby et al. ................ 359/152 |
| 5,434,747 A | 7/1995 | Shibata ....................... 361/753 |
| 5,446,814 A | 8/1995 | Kuo et al. ..................... 385/31 |
| 5,452,387 A | 9/1995 | Chun et al. ................... 385/88 |
| 5,455,703 A | 10/1995 | Duncan et al. .............. 359/152 |
| 5,470,259 A | 11/1995 | Kaufman et al. ............ 439/607 |
| 5,475,734 A | 12/1995 | McDonald et al. ........... 379/58 |
| 5,478,253 A | 12/1995 | Biechler et al. ............. 439/181 |
| 5,482,658 A | 1/1996 | Lebby et al. ................ 264/1.24 |
| 5,487,678 A | 1/1996 | Tsuji et al. .................. 439/352 |
| 5,491,712 A | 2/1996 | Lin et al. ...................... 372/50 |
| 5,499,311 A | 3/1996 | DeCusatis .................... 385/89 |
| 5,499,312 A | 3/1996 | Hahn et al. ................... 385/91 |
| 5,515,468 A | 5/1996 | DeAndrea et al. ............ 385/88 |
| 5,528,408 A | 6/1996 | McGinley et al. .......... 359/152 |
| 5,535,296 A | 7/1996 | Uchida ........................ 385/89 |
| 5,546,281 A | 8/1996 | Poplawski ................... 361/752 |
| 5,547,385 A | 8/1996 | Spangler ..................... 439/101 |
| 5,548,677 A | 8/1996 | Kakii et al. ................... 385/92 |
| 5,550,941 A | 8/1996 | Lebby et al. ................. 385/49 |
| 5,554,037 A | 9/1996 | Uleski ....................... 439/76.1 |
| 5,561,727 A * | 10/1996 | Akita et al. ................... 385/88 |
| 5,567,167 A | 10/1996 | Hayaski ...................... 439/75 |
| 5,577,064 A | 11/1996 | Swirhun et al. .............. 372/96 |
| 5,580,269 A | 12/1996 | Fan ............................. 439/79 |
| 5,596,663 A | 1/1997 | Ishibashi et al. .............. 385/92 |
| 5,598,319 A | 1/1997 | Lee ............................ 361/684 |
| 5,599,595 A | 2/1997 | McGinley et al. ............ 428/33 |
| 5,629,919 A | 5/1997 | Hayashi et al. ............. 369/112 |
| 5,631,998 A | 5/1997 | Han ............................. 386/68 |
| 5,687,267 A | 11/1997 | Uchida ........................ 385/89 |
| 5,696,669 A * | 12/1997 | Bassler et al. .............. 361/752 |
| 5,717,533 A | 2/1998 | Poplawski et al. .......... 361/752 |
| 5,724,729 A | 3/1998 | Sherif et al. .................. 29/840 |
| 5,734,558 A * | 3/1998 | Poplawski ................... 361/752 |
| 5,736,782 A | 4/1998 | Schairer ..................... 257/679 |
| 5,767,999 A * | 6/1998 | Kayner ....................... 359/163 |
| 5,779,504 A | 7/1998 | Dominiak et al. .......... 439/709 |
| 5,847,932 A * | 12/1998 | Kantner ...................... 361/737 |
| 5,879,173 A * | 3/1999 | Poplawski ................... 439/138 |

FOREIGN PATENT DOCUMENTS

| | | |
|---|---|---|
| EP | 0437161 A2 | 7/1991 |
| EP | 442 608 A2 | 8/1991 |
| EP | 0535473 A1 | 4/1993 |
| EP | 0 656 696 A1 | 2/1994 |
| EP | 0600645 A1 | 6/1994 |
| EP | 0613032 A2 | 8/1994 |
| EP | 0 456 298 BI | 2/1996 |
| GB | 2 264 843 | 8/1993 |
| GB | 2288939 A | 11/1995 |
| JP | 61-158046 | 9/1986 |
| JP | 61-188385 | 8/1987 |
| JP | 63-16496 | 2/1988 |
| JP | 63 65967 | 4/1988 |
| JP | 63 65978 | 4/1988 |
| JP | 63-82998 | 5/1988 |
| JP | 1-237783(A) | 9/1989 |
| JP | 2-87837 | 3/1990 |
| JP | 2-151084 | 6/1990 |
| JP | 3-94869 | 4/1991 |
| JP | 4-270305 | 4/1991 |
| JP | 4-50901(A) | 2/1992 |
| JP | 4-165312 | 6/1992 |
| JP | 4-87809 | 7/1992 |
| JP | 4-221207 | 8/1992 |
| JP | 4-229962 | 8/1992 |
| JP | 4-230978 | 8/1992 |
| JP | 4-109593 | 9/1992 |
| JP | 4 234715 | 5/1993 |
| JP | 5-290913 | 5/1993 |
| JP | 5-197850 * | 8/1993 |
| JP | 5-211379 | 8/1993 |
| JP | 5-70955 | 9/1993 |
| WO | WO 90/14607 | 11/1990 |

OTHER PUBLICATIONS

AMP Inc. "Lytel Molded-Optronic SC Duplex Transceiver" Dec. 1993 from Catalog 65922.

AMPHENOL Engineering News dtd Nov. 1994 vol. 7 No. 6.

AT&T Microelectronics, "1408-Type ODL Transceiver" Feb. 1994 preliminary data sheet.
Baldwin and Kellerman, "Fiber Optic Module Interface Attachment " Research disclosure Oct. 1991.
Block and Gaio "Optical Link Card guide/Retention Sys" Research Disclosures Apr. 1993.
Cinch Hinge Connectors Catalog CM-16, Jul. 1963.
Computer Reseller News May 24, 1999—"Cicso Makes Mark in Switch Clusting".
Conductive Coatings by Dieter Gwinner.
Encapsulation of Electronic Devices and Components by Edward R. Salmon.
Gigabit Interface Converter (GBIC)—Specifications Revision 5.1a.
Hewlett-Packard Information for HP 5061-5800 Fiber Optic Interface converter including Declaration of Steve Joiner, Ph.D.
Hewlett-Packard Optoelectronics Designer's Catalog (1991-1992).
High Density Input/Output Connector Systems by Robert C. Herron.
IBM Technical Disclosure Bulletin dated Mar. , 1987 vol. 29 No. 10.
IBM Fiber Channel 266 Mb/sOptical Link Cards.
James C. Pintner, Senior Attorney, Hewlett-Packard Company, letter dated Aug. 19, 1998.
Japanese Standards Association's "Japanese Industrial Standard F04 Type Connectors for Optical Fiber Cords JIS C 5973" 1990.
Leydig, Voit & Mayer, Ltd. letter to Methode Electronics from Mark E. Phelps, dated Jun. 21, 1999.
Methode Electronics letter to Leydig, Voit & Mayer, Ltd. from David L. Newman, dated Jun. 30, 1999.
Leydig, Voit & Mayer, Ltd. letter to Methode Electronics from Mark E. Phelps, dated Jun. 30, 1999.
Low Cost Fiber Physical Layer Medium Dependent Common Transceiver Footprint data sheet Jun. 23, 1992.
Siemens, "Low-Cost ATM" Advertisement.
Steve Joiner, Ph.D. Deposition Transcript and Exhibits dated May 12, 1998.
Sumitomo Electric Fiber Optics Corp. "Tranceiver Manufacturerers to Support Common Footprint for Desktop FDDI Applications," pre release and.
Headsup—Sumitomo Electric Lightwave joins other in announcement.
Sumitomo Electric Fiber Optics Corp Product Bulletin—FDDI Optical Transceiver.
Preliminary Bulletin FDDI Optical Transceiver Module—Sumitomo Electric.
Thomas & Betts Catalog 1988 for Info-Lan Modem.
Weik, "Communication Standard Dictionary" 1983 p. 454.
Vixel Corporation's Response Chart (Methode Electronics, Inc. v. Vixel Corporation. C98 20237 RMW EAI) Including explanation of 5,717,533 and 5,734,558 and citation of additional references; prepared Oct. 16, 1998.

* cited by examiner

MULTI-PORT PLUGGABLE TRANSCEIVER (MPPT) WITH MULTIPLE LC DUPLEX OPTICAL RECEPTACLES

This application hereby incorporates herein by reference U.S. patent application Ser. No. 09/160,816 filed on Sep. 25, 1998, and U.S. Pat. No. 5,879,173.

BACKGROUND OF THE INVENTION

1. Field of the Invention

The present invention relates to an improved pluggable electronic module configured to connect and/or convert data signals from a first serial transmission medium to a second serial transmission medium. A preferred embodiment of the invention is related to a GigaBit Interface Converter (GBIC) as defined by the GBIC specification (Small Form Factor document number: SFF-8053, revision 5.1a), the teaching of which is hereby incorporated herein by reference. Specifically, the preferred embodiment includes an interface converter module having four optical sub-assemblies, thus forming the multi-port pluggable transceiver. However, the improvements disclosed in this specification are applicable to high-speed data communication modules other than GBICs as well.

2. Discussion of the Background

The GBIC specification was developed by a group of electronics manufacturers in order to arrive at a standard small form factor transceiver module for use with a wide variety of serial transmission media and connectors. The specification defines the electronic, electrical, and physical interface of a removable serial transceiver module designed to operate at Gigabit speeds. A GBIC provides a small form factor pluggable module which may be inserted and removed from a host or switch chassis without powering off the receiving socket. The GBIC standard allows a single standard interface to be changed from a first serial medium to an alternate serial medium by simply removing a first GBIC module and plugging in a second GBIC having the desired alternate media interface.

The GBIC form factor defines a module housing which includes a first electrical connector for connecting the module to a host device or chassis. This first electrical connector mates with a standard socket which provides the interface between the host device printed circuit board and the module. Every GBIC has an identical first connector such that any GBIC will be accepted by any mating GBIC socket. The opposite end of the GBIC module includes a media connector, which can be configured to support any high performance serial technology. These high performance technologies include: 100 Mbyte multi-mode short wave laser without OFC; 100 Mbyte single-mode long-wave laser with 10 km range; Style 1 intracabinet differential ECL; and Style 2 intracabinet differential ECL.

The GBIC module itself is designed to slide into a mounting slot formed within the chassis of a host device. The mounting slot may include guide rails extending back from the opening in the chassis wall or faceplate. At the rear of the slot the first electrical connector of the module engages the mating socket which is mounted to a printed circuit board within the host device. The GBIC specification requires two guide tabs to be integrated with the electrical connector. As the connector is mated with the socket, the guide tabs of the connector engage similar structures integrally formed with the socket. The guide tabs are to be connected to circuit ground on both the host and the GBIC. The guide tabs engage before any of the contact pins within the connector and provide for static discharge prior to supplying voltage to the module. When the GBIC is fully inserted in this manner, and the connector fully mated with the socket, only the media connector extends beyond the host device chassis faceplate.

The GBIC specification document only provides for a single transmit function and a single receive function. For example, the optical GBIC at the media connector end accepts a duplex SC optical connector having one ferrule for transmitting data and one ferrule for receiving data. As the desire for increased bandwith continues, increasing density of media connectors is also desired. Therefore, it is an object of this invention to provide an interface converter module having multiple optical ports.

SUMMARY OF THE INVENTION

In light of the related art as described above, one of the main objectives of the present invention is to provide an improved small form factor interface module for exchanging data signals between a first transmission medium and a second transmission medium.

A further object of the present invention is to provide an improved small form factor interface module configured to operate at speeds in excess of 1 Giga-Bit per second.

Yet another object of the present invention is to provide a high density optical transceiver module.

Still another object of the present invention is to provide a multi-port pluggable transceiver.

Another objective of the present invention is to provide an improved interface module to prevent spurious electromagnetic emissions from leaking from the module.

Another objective of the present invention is to provide an improved interface module having a die cast metal outer housing including a ribbon style connector housing integrally formed therewith.

Another objective of the present invention is to provide an improved interface module having a die cast metal outer housing including detachable insulated latch members for releasably engaging a host device socket.

Another objective of the present invention is to provide an improved interface module having a die cast metal outer housing with an integrally cast electrical connector, including guide tabs electrically connected to the circuit ground of the module and configured to engage similar ground structures within a host device socket.

A further objective of the present invention is to provide an improved GBIC-like module having a media connector incorporated with the GBIC-like housing and integrally formed therewith in order to provide an inexpensive, easily assembled module.

Another object of the present invention is to provide an interface module having more than two optical receptacles or ports.

It is a further object of the present invention to provide an interface module having two LC duplex optical receptacles incorporated as the media connector formed with the module housing.

It is another object of the invention to provide each LC duplex optical receptacle with a TOSA and a ROSA.

It is a further object of the invention to provide a means for keying the GBIC module to the GBIC receptacle so as to differentiate between a GBIC having one transceiver and a GBIC having two transceivers.

All of these objectives, as well as others that will become apparent upon reading the detailed description of the presently preferred embodiment of the invention, are met by the Multi-Port Pluggable Transceiver (MPPT) herein disclosed.

The present invention provides a small form factor, multi-port, high speed serial interface module. The module is configured to slide into a corresponding slot within the host device chassis where, at the rear of the mounting slot, a first connector engages the host socket. A latching mechanism may be provided to secure the module housing to the host chassis when properly inserted therein. It is desirable to have a large degree of interchangeability in such modules, therefore across any product grouping of such modules, it is preferred that the first connector be identical between all modules within the product group, thus allowing any particular module of the group to be inserted into any corresponding host socket. It is also preferred that the first connector include sequential mating contacts such that when the module is inserted into a corresponding host socket, certain signals are connected in a pre-defined staggered sequence. By properly sequencing the power and grounding connections the module may be "Hot Pluggable" in that the module may be inserted into and removed from a host socket without removing power to the host device. Once connected, the first connector allows data signals to be transferred from the host device to the interface module.

The preferred embodiment of the invention is to implement a remote mounted media connector on a standard GBIC-like module according the GBIC specification. However, it should be clear that the novel aspects of the present invention may be applied to interface modules having different form factors, and the scope of the present invention should not be limited to GBIC modules only.

In a preferred embodiment, the module is formed of a two piece die cast metal housing including a base member and a cover. In this embodiment the host connector, typically a D-Shell ribbon style connector, is integrally cast with the base member. The cover is also cast metal, such that when the module is assembled, the host end of the module is entirely enclosed in metal by the metal base member, cover, and D-Shell connector, thereby effectively blocking all spurious emissions from the host end of the module.

A printed circuit board is mounted within the module housing. The various contact elements of the first electrical connector are connected to conductive traces on the printed circuit board, and thus serial data signals may be transferred between the host device and the module. The printed circuit board includes electronic components necessary to transfer data signals between the copper transmission medium of the host device to the transmission medium connected to the output side of the module. These electronic components may include passive components such as capacitors and resistors for those situations when the module is merely passing the signals from the host device to the output medium without materially changing the signals, or they may include more active components for those cases where the data signals must be materially altered before being broadcast on the output medium.

In a further preferred embodiment, a portion of the printed circuit board extends through the cast metal D-Shell connector. The portion of the printed circuit board extending into the D-Shell includes a plurality of contact fingers adhered thereto, thereby forming a contact support beam within the metal D-Shell forming a ribbon style connector.

The module housing includes a dual LC duplex transceiver optical receptacle positioned within the module. Each transceiver of the LC duplex optical receptacle having a TOSA and a ROSA.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PRESENTLY PREFERRED EMBODIMENTS

Figure 1:
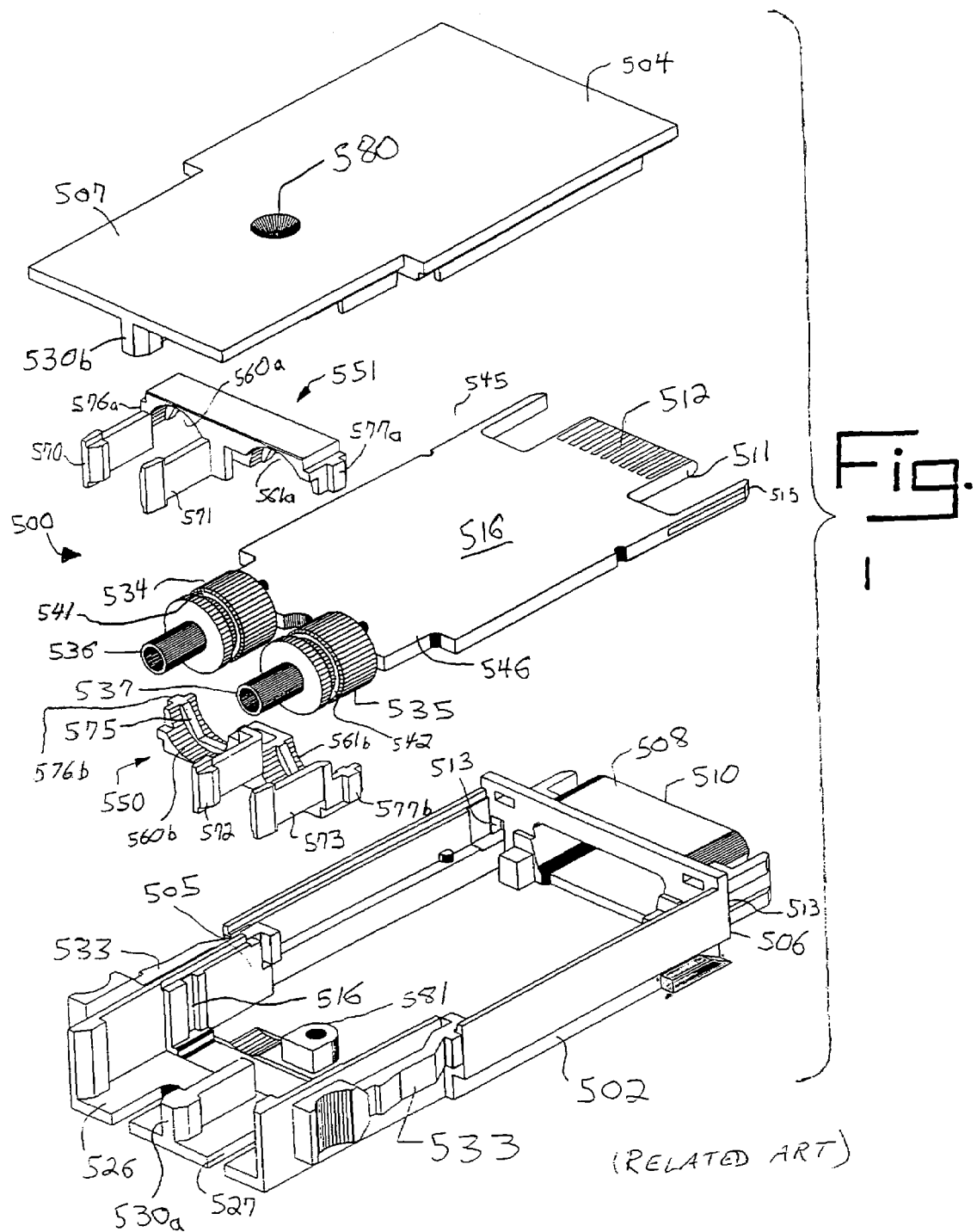
FIG. 1 is an isometric exploded view of a related art interface module.
Figure 2A:
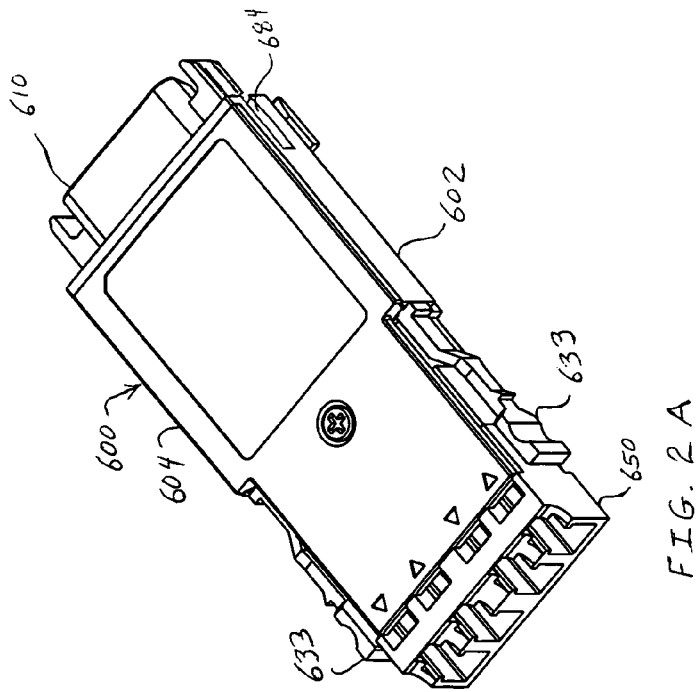
FIGS. 2A, 2B, 2C, and 2D, are perspective, top, front, and side views of a first embodiment of the interface module of the invention containing two LC duplex fiber optic connectors.
Figure 2D:
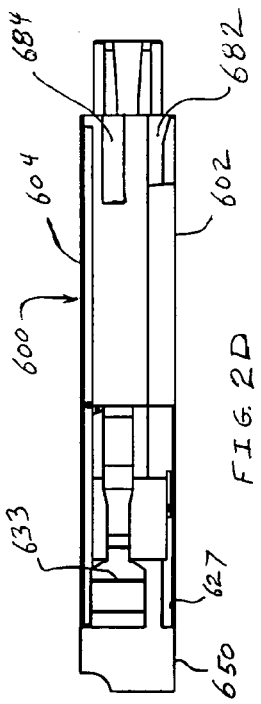
Figure 2B:
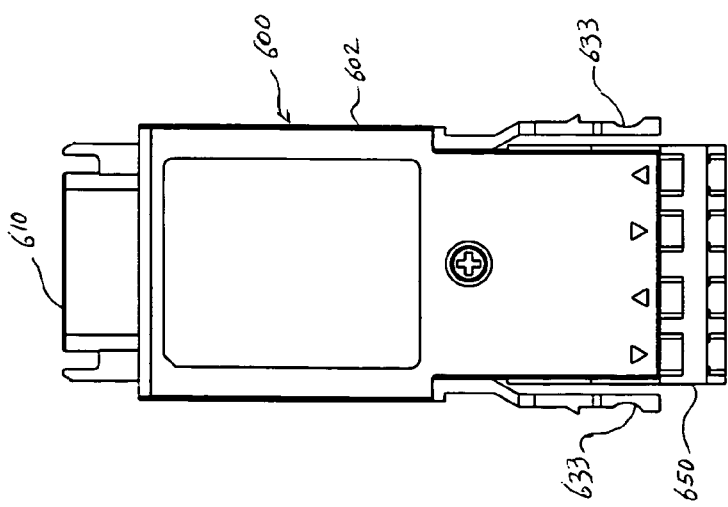
Figure 2C:
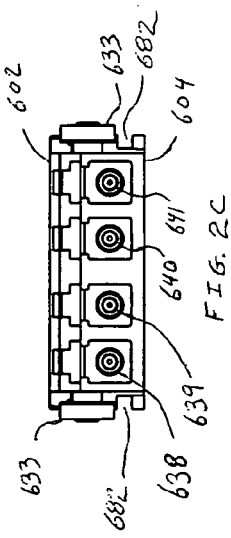
Figure 3:
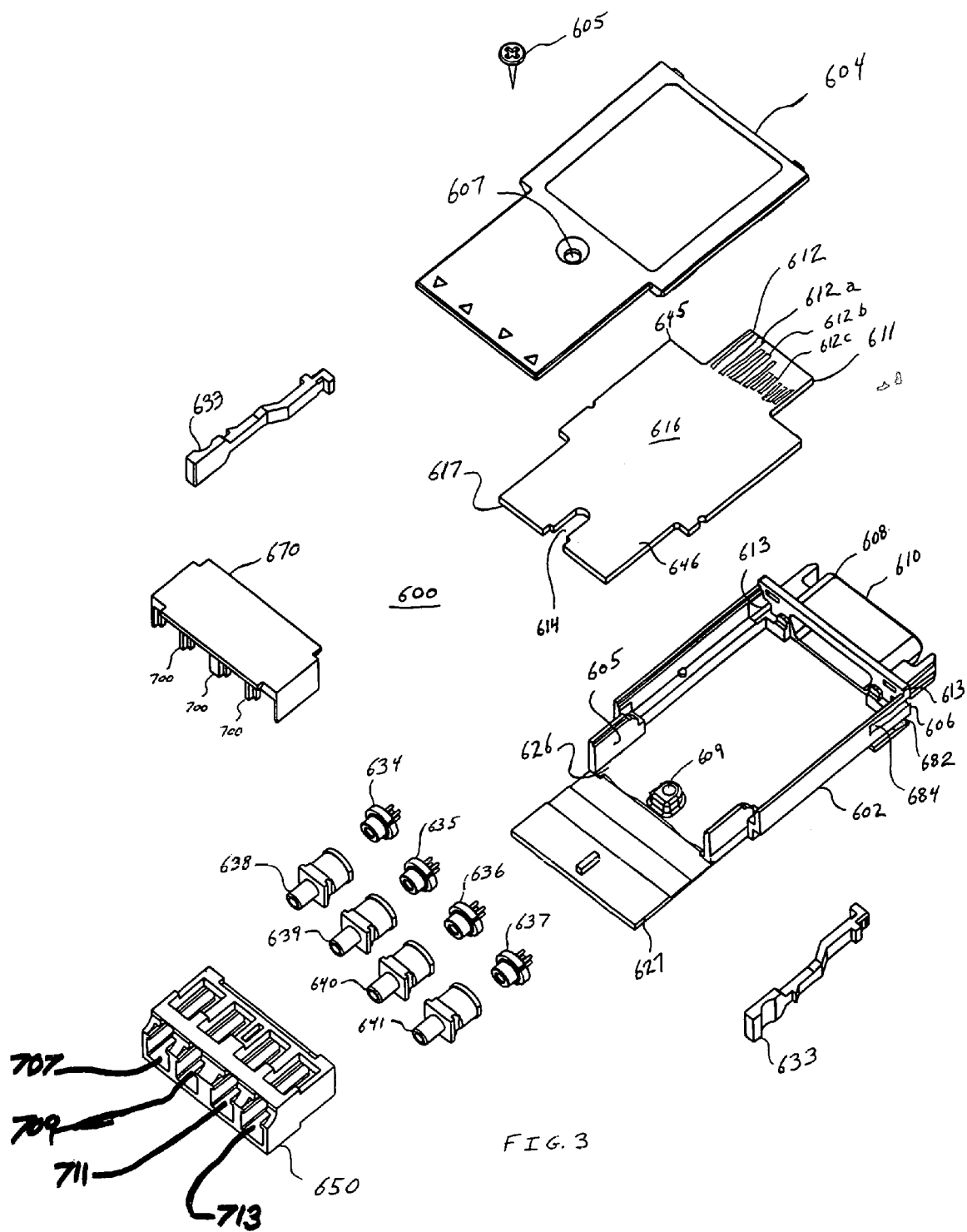
FIG. 3 is an isometric exploded view of the embodiment of the interface module of FIGS. 2A–2D.
Figure 4:
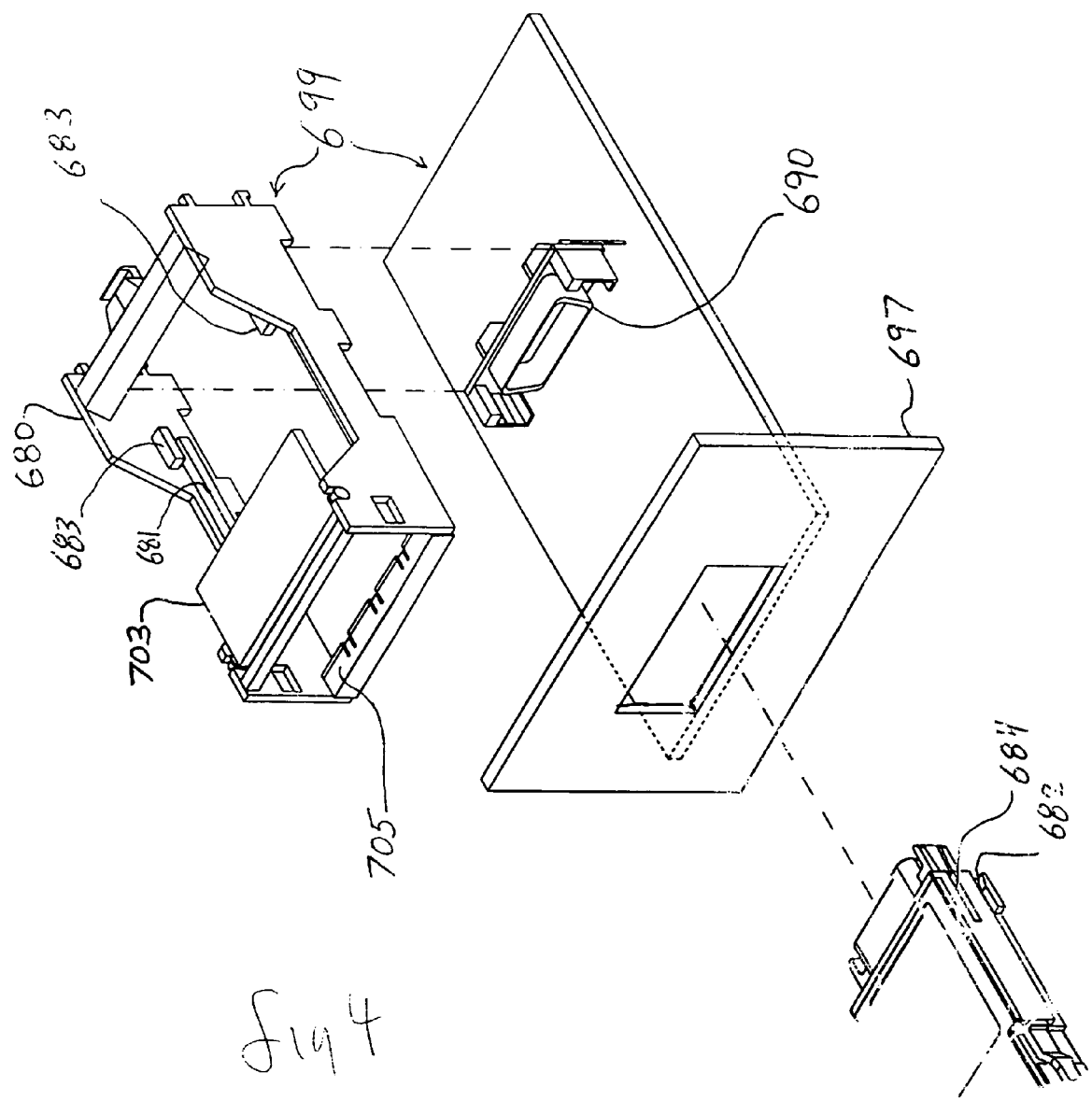
FIG. 4 is a perspective view of the LC duplex transceiver module, as shown in FIGS. 2 and 3, a receptacle for receiving the transceiver module, and a circuit card connector.

Referring now to the drawings, wherein like reference numerals designate identical or corresponding parts throughout the several views, and more particularly to FIGS. 2, 3, and 4. However, first, the invention will be better understood after a discussion of related material as shown in FIG. 1. FIG. 1 discloses an exploded isometric view of an interface converter module 500. Generally, the module 500 converts electrical signals to or from optoelectronic signals and is compliant with the GBIC specification. The module 500 includes a cover 504, a printed circuit board 516 and a base 502. At the first end of the module 506 on the base is an integrally formed connector 510 for connecting with a host device. The connector includes a D-shaped shroud 508 for receiving the contact beam 511 of the printed circuit board 516. The contact beam 511 includes contact traces 512 that are inserted within the shroud 508 in order to form a pluggable male ribbon style connector 510. The base 502 is formed of a die-cast metal and the connector 510 is also formed of one piece with the base 502 of the die-cast metal. The printed circuit board also includes guide tabs 515 which are inserted into apertures 513 of the base 502. A contact beam 511 is located at the first end 545 of the printed circuit board.

At the second end 546 of the printed circuit board is located a first optical subassembly 534 and a second optical subassembly 535. The first optical subassembly 534 is a transmitting optical subassembly (TOSA) which can be a VCSEL. However, any type of optical transmitting device may be used including an LED or other surface emitting laser. The second optical subassembly 535 is a receiving optical subassembly (ROSA) which can be a photo diode. However, any type of optical receiving material may be used. The optical subassemblies 534, 535 are mounted at the second end 546 of the printed circuit board 516 and are electrically connected to the circuitry and components on the printed circuit board 516 and provide for the conversion of signals as discussed above for the Giga-Bit Converter specification. Protruding from the optical subassembly 534, 535, are ferrule receiving barrels 536, 537, respectively.

The second end 546 of the printed circuit board 516 is mounted within the second end 505 of the base 502. The second end 505 of the base 502 includes a receptacle opening 526 that forms an SC duplex receptacle. The standardized SC duplex opening 526 includes a pair of rectangular shaped openings, polarizing slots 527 and a center wall 530a to separate the pair of receptacle openings. The cover 504 at the second end 507 includes center wall 530b which mounts on top of wall 530a of the base 502 in order to completely separate the pair of optical receptacles.

A first optical subassembly mounting half 550 is provided for orienting and securing the optical subassemblies 534, 535 within the module 500. The first optical subassembly mounting half 550 mates with a second optical subassembly mounting half 551 in order to capture therein the pair of optical subassemblies 534, 535. Each mounting half 550, 551 includes a throughport half 560a, 560b, 561a, and 561b. In a preferred embodiment the throughport 560a of the second mounting half 551 includes a pair of latch arms 570, 571 protruding therefrom. Alternatively the first mounting half 550 includes a pair of latch arms, 572, 573 protruding adjacent the throughport 561b. Each mounting half throughport 560a, 560b and 561a, 561b include hexagonal shaped locating walls 575. The locating walls 575 mate with the groove 541, 542 of the optical subassembly 534, 535. Therefore upon assembly of the mounting half 550, 551 the hexagonal shaped walls 575 will align with the grooves 541, 542 of the optical subassembly 534, 535 in order to position the optical subassemblies within the mounting halves 550, 551. The mounting halves mate together in order that the latch arms 570, 571 are centered adjacent the throughport 560a, 560b and also are laterally positioned adjacent the latch arms 572, 573 which are axially centered to the throughports 561a, 561b. The mounting halves 550, 551 can be formed of an insulating material such as a polymer material, for example, LCP, that will insulate the optical subassemblies from the conductive base 502 and cover 504. The optical subassemblies 534, 535 may be formed of conductive material or portions thereof may be conductive and the electrical isolation of the optical subassemblies from the conductive housing of the module is necessary in order to reduce electromagnetic interference and/or electromagnetic radiation.

The mounting halves 550, 551 also include side protrusions 576a, 576b and 577a and 577b. When the mounting halves 550, 551 are joined together a side protrusion 557a, 577b is formed that runs along the majority of the height of the complete mounting member at a side adjacent the throughport 561a, 561b and a side protrusion 576a, 576b that runs along the majority of the height of the mounting member adjacent througport 560a, 560b. The side protrusion 576a, 576b is received in slot 516 of the base 502 when the printed circuit board 516 and the mounting members 550, 551 are mounted within the base 502.

The module 500 is assembled according to the following steps. The first optical assembly mounting half 550 is mounted within the second end 505 of the base 502 having side protrusion 576b aligned within slot 516 and side wall 577b aligned in a slot on the wall opposite slot 516. The printed circuit board 516 is oriented above the base 502 and the first end 545 of the printed circuit board is mounted within the base by inserting guide tabs 515 within apertures 513 and simultaneously sliding contact beam 511 within the D-shaped shell 508. The second end 546 of the printed circuit board is then lowered into the base 502 so that the optical subassemblies, 534, 535 are mounted onto the first mounting half 550 so that the hexagonal walls 575 align with grooves 541, 542. The second optical subassembly mounting half 551 is then mounted within the base 502 and aligned with the first mounting half 550 in order to capture the optical subassemblies 534, 535 within the throughports 560a, 561b and 561a, 561b by aligning the hexagonal walls of the second mounting half 551 to the grooves 541, 542 of the optical subassemblies 534, 535. Release lever arms 533 are then mounted onto the base. The cover 504 is then placed onto the base 502 and a securing member is inserted in the aperture 580, through the printed circuit board and into aperture 581 in the base 502. By tightening the securement member the cover is secured to the base 502 and simultaneously secures the mounting halves 550, 551 within the housing to secure the optical subassemblies within the module and also secure the release lever arms 533 to the module. Therefore, it can be understood that the interface converter module 500 is assembled quickly and inexpensively with very few components. It may be understood that the securement of the mounting halves 550, 551 within the module housing via the side walls 576a, 576b and 577a, 577b within slots 516 of the base 502 provide for the optical subassemblies 534, 535 to be centered axially within the openings 526 of the SC duplex receptacle formed at the second end 505 of the module 500. The hexagonal walls 575 of the mounting halves 550, 551 act to center the optical subassemblies in the throughports 560a, 560b, and 561a, 561b both in the x, y and z planes. Therefore, an interface converter is provided for converting optical signals to or from electrical signals by the insertion of an SC plug into the receptacle opening 526 of the module and such signals will be transferred through the circuitry of the printed circuit board 516 through the contact fingers 512 and to or from a host device to which the connector 510 of the module 500 is mounted.

Typically, the twenty pins or contacts of the connector 510 of the gigabit interface converter having a receiver and a transmitter correspond to the following description. Pin 1 is labeled RX_LOS. The RX_LOS signal is intended as a preliminary indication to the system in which the GBIC is installed that the link signals are likely to be outside the required values for proper operation. The host shall provide a 4.7K to 10K ohm pullup resistor to V$_{DD}$R. Pin 2 is labeled RGND, which is receiver ground. Pin 3 is labeled RGND, which is receiver ground. Pin 4 is labeled MOD_DEF (0), which is GBIC module definition and presence, bit 0, 4.7K to 10K Ohm pullup resistor to V$_{DD}$T on host. Pin 5 is labeled MOD_DEF(1), which is GBIC module definition and presence, bit 1 4.7K to 10K Ohm pullup resistor to V$_{DD}$T on host. Pin 6 is labeled MOD_DEF (2), which is GBIC module definition and presence, bit 2 4.7K to 10K Ohm pullup resistor to V$_{DD}$T on host. Pin 7 is labeled TX_DISABLE, which is active high logic input which disables the optical output. This signal is driven by the host. This pin is internally pulled up to V$_{DD}$T through a 10K ohm resistor for short wavelength and a 4.7K ohm resistor for long wavelength. Pin 8 is labeled TGND, which is transmitter ground. Pin 9 is labeled TGND, which is transmitter ground. Pin 10 is labeled TX_FAULT, which is active high signal. A TX_FAULT is defined as the failure of the optical output of the GBIC and it is internally latched. The host shall provide a 4.7K to 10K ohm pullup resistor to V$_{DD}$T. Pin 11 is labeled RGND, which is receiver ground. Pin 12 is labeled −RX_DAT, which is receiver data inverted differential output. Pin 13 is labeled +RX_DAT, which is receiver data non-inverted differential output. Pin 14 is labeled RGND, which is receiver ground. Pin 15 is labeled V$_{DD}$R, which is a +5V supply for receiver section. Pin 16 is labeled V$_{DD}$T, which is a +5V supply for transmitter section. Pin 17 is labeled TGND, which is transmitter ground. Pin 18 is labeled +TX_DAT, which is transmitter data non-inverted differential output. Pin 19 is labeled −TX_DAT, which is transmitter data inverted differential output. Pin 20 is labeled TGND, which is transmitter ground.

Figure 5:
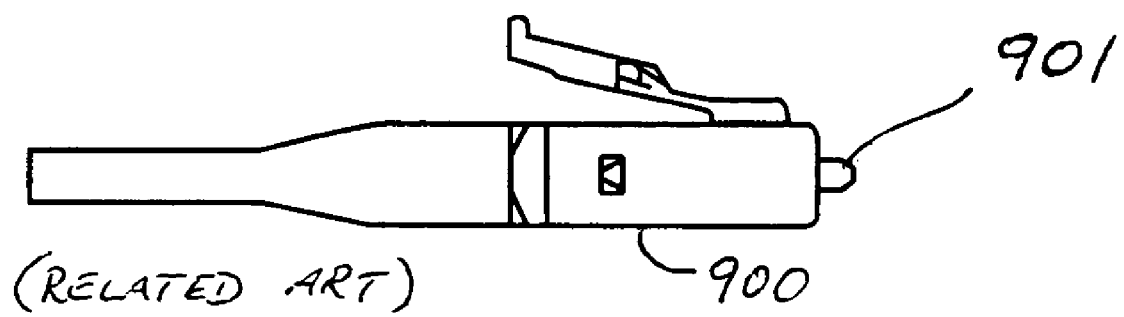
FIG. 5 is a side view of a fiber optic LC connector of the related art.

Recently, optical connectors have been made available that are much smaller in diameter and allow for twice the density as would be possible in a traditional GBIC. Traditionally, the optical connector ferrule had a diameter of 2.5 mm. Now, optical connector ferrules can be produced which have a diameter of 1.25 mm, and correspondingly reduced size housings. For example, the LC connector is produced by Lucent Technologies and is incorporated into the LC connector family for both single mode and multi mode fiber type. FIG. 5 is a side view of the fiber optic LC connector 900 having the fiber optic connector ferrule 901 which is matable with a LC receptacle. The LC connector family of products include connectors and adapters, which include duplex connectors and housings.

However, transceivers that accept LC connectors are not readily available. An embodiment of Applicant's invention is shown in FIGS. 2 and 3. Applicant has developed a novel and improved packaging of four optical subassemblies of the LC-type into a module 600 having outer dimensions similar to those of the standard GBIC specification document such as the module 500, as shown in FIG. 1. Thus, the multi-port pluggable transceiver (MPPT) 600 shown in FIGS. 2 and 3 provides nearly twice the data-flow rate as the related art GBIC module 500. The doubling of the data transfer flow rate is a goal which has only now been met by the present invention.

FIG. 2A is a perspective view of an embodiment of the invention. FIG. 2B is a top view of the embodiment. FIG. 2C is a front or connector end view of the embodiment. FIG. 2D is a side view of the embodiment. FIG. 3 is an exploded isometric view of the embodiment of the interface converter MPPT module 600. Generally, the MPPT module 600 differs from the previous discussed module which also converts electrical signals to or from optoelectronic signals because the MPPT module 600 accepts a larger number of inputs/outputs. The module 600 includes a cover 604, a printed circuit board 616 and a base 602. At the first end of the module 606 on the base is an integrally formed connector 610 for connecting with a host device. As previously discussed, this connector includes a D-shaped shroud 608 for receiving the contact beam 611 of the printed circuit board 616. The contact beam 611 includes contact traces 612 that are inserted within the shroud 608 in order to form a pluggable male ribbon style connector 610. FIG. 3 shows ten of the contact traces or contact fingers 612 and an equal number of contact traces are formed on the underside of the contact beam 611. As discussed above, the base 602, in a preferred embodiment, is formed of a die-cast metal and the connector 610 is also formed of one piece with the base 602 of the die-cast metal. As discussed above, the printed circuit board also dispenses with guide tabs 515 of module 500 which were formerly inserted into apertures 513 of the base 502. A contact beam 611 is located at the first end 645 of the printed circuit board.

The interface converter module or multi-port pluggable transceiver (MPPT) 600 of the present invention is similar to the device 500 disclosed in FIG. 1 except for the substitution of the single transceiver set or module, as shown in FIG. 1, for the dual transceiver set comprising four optical sub-assemblies, as shown in FIG. 3. However, in a preferred embodiment the contact beam 611 has the same number of contact traces as the contact beam 511 of the previous device. To accommodate the electrical connections of the increased number of optical sub-assemblies only a select few of the functions of the GBIC module 500 inputs/outputs will be included so that the contact beam 611 will have only twenty contact traces. Alternate embodiments of the present invention having some or all of the functions of the device discussed above for FIG. 1 may be incorporated into the present MPPT by utilizing a 40 contact connector.

Thus, the MPPT module 600 will be able to utilize the existing rail system as disclosed in the GBIC standard with minor modifications. The modified rail system for the multi-port pluggable transceiver (MPPT) module 600 will have a narrower guide rib 681 as shown in the detailed view of FIG. 4. The multi-port pluggable transceiver 600 has a narrower slot 682. Therefore, a new style multi-port pluggable transceiver 600 will not insert into the existing rail assembly that conforms to the GBIC standard. The male ribbon style connector receptacle (690 in FIG. 4) may be used without modifications.

The modification to the rail assembly 680 is desirable to prevent the possibility of the new MPPT module 600 from being plugged into receptacles which are in the field today. The new MPPT module 600 will have a different configuration of electrical signals on contacts 612 and thus is incompatible with older systems. This method of "keying" the rail system will ensure that the new MPPT module 600 will not be accidentally inserted into existing single port or transceiver GBIC hubs, switches, and routers manufactured for a standard GBIC 500.

In order to prevent the older style single transceiver GBIC modules 500 from being accidentally plugged into the new dual transceiver receptacle, the rail system has an additional feature built in which acts to prevent the old style one transceiver GBIC modules 500 from mating with the modified rail system. An additional rib 683 is raised on the guide rail assembly 680 which engages rib receiving slot 684 on the MPPT 600. Slot 684 may be created by machining or by modification of the die casting tool. Guide tabs have been omitted in the new multi-port pluggable transceiver 600. In the MPPT module 600, slot 684 is slidingly engaged by rib 683 on the modified guide rail assembly 680. Because the older style single transceiver GBICs do not have this slot, the older style single transceiver GBIC as in module 500 cannot be accidentally plugged into the new multi-port pluggable transceiver receptacle comprised of rail assembly 680 and rib 683. The MPPT 600 still provides for hot plugging as discussed below in the absence of a guide tab.

The inclusion of two duplex ports requires the input/output signals to the MPPT module 600 to be reconfigured. The availability of ten pins or contact traces per transceiver provides adequate capacity to achieve a reliable robust electrical interface. Ten pins also accommodates enough control and status lines to provide the host system adequate control and sensing capability. In the preferred embodiment, each port of the MPPT 600 will have the following signals: 1) transmitter power supply; 2) transmit data (+) input; 3) transmit data (−) input; 4) transmit disable input; 5) transmitter signal ground; 6) receiver power supply; 7) receive data (+) output; 8) receive data (−) output; 9) signal detect output; and 10) receiver signal ground. The second transceiver of the MPPT GBIC 600 also has the same number and type of signals to bring the total number of signals up to twenty.

Hot pluggability is still achieved even though the guide tab ground contacts 515 are eliminated. The electrical contacts on beam 611 are sequenced or staggered so as to connect grounds first, power second, and all remaining signals third. This is done by setting back from the edge of the end beam 611 the power traces 612*b*. The ground traces 612a extend all the way to the edge of beam 611 or may be separated by a small first distance from the edge of the beam 611. The signal traces 612c are set back or offset by a third distance which is even further from the edge of the beam 611 than the power traces 612b which are set back by a second distance.

At the second end 646 of the printed circuit board is located a first optical device 634, a second optical device 635, a third optical device 636, and a fourth optical device 637. The optical devices 634, 635, 636, and 637, attach to the printed circuit board 616 along an edge 617. In a preferred embodiment the first and third optical devices 634, 636 are transmitting optical devices which may be a VCSEL. However, any type of optical transmitting device may be used including an LED or an edge emitting laser. In a preferred embodiment the second and fourth optical devices 635, 637 are receiving optical devices which include a photo diode. The optical devices 634, 635, 636, 637 are mounted at the second end 646 of the printed circuit board 616 and are electrically connected to the circuitry and components on the printed circuit board 616. Attached and aligned to the optical devices 634, 635, 636, 637, are ferrule receiving barrels 638, 639, 640, 641, respectively. A receiving optical device coupled to a ferrule receiving barrel forms a ROSA which is an acronym for receiving optical subassembly. A transmitting optical device coupled to a ferrule receiving barrel forms a TOSA which is an acronym for transmitting optical subassembly.

The second end 646 of the printed circuit board 616 is mounted within the second end 605 of the base 602. The second end 605 of the base 602 includes a receptacle opening 626. A ledge 627 is formed at the second end 646 of the base 602 for receiving a dual LC duplex receptacle 650. The dual LC duplex receptacle 650 is a media connector that has four ports or openings 707, 709, 711, and 713. The dual LC duplex receptacle 650 accepts a mating media connector such as four individual fiber optic LC connectors 900 (see FIG. 5). A conductive transceiver cover 670 is shown, which covers the optical subassemblies and completely separates each optical subassembly from one another with wall-like structures 700 thus reducing EMI/RFI. The conductive transceiver cover 670 can be formed of a die cast metallic material or it can be formed of a polymer, where a surface of the polymer is metallized.

The MPPT module 600 is assembled according to the following steps. Optical devices 634, 635, 636, and 637, are attached to respective ferrule receiving barrels 638, 639, 640, and 641, by way of laser spot welding. They are then soldered to circuit board 616. The printed circuit board 616 is oriented above the base 602 and the first end 645 of the printed circuit board is mounted within the base by sliding contact beam 611 within the D-shaped shell 608. The second end 646 of the printed circuit board is then lowered into the base 602. The dual LC duplex receptacle 650 is positioned onto ledge 627 of the base 602 so as to receive the ferrule receiving barrels 638, 639, 640, and 641. As such, the ferrule receiving barrels 638, 639, 640, and 641, protrude into the LC duplex receptacle 650. The transceiver cover 670 is placed over the optical subassemblies so as to completely separate each optical subassembly from one another. Release lever arms 633, 633 are then mounted onto the base 602. The release lever arms 633 are the same as the release lever arms 533. The cover 604 is then placed onto the base 602 and a securing member is inserted in the aperture 607, through the slot 614 of the printed circuit board 616 and into aperture 609 in the base 602. By tightening the securement member 605 the cover 604 is secured to the base 602 and simultaneously secures the transceiver cover 670 and the LC duplex receptacle 650 within the housing to secure the optical subassemblies within the module and also secure the release lever arms 633 to the module. In the preferred embodiment, securement member 605 is a self tapping screw.

FIG. 4 is an exploded perspective view showing the multi-port pluggable transceiver 600, a guide rail assembly 680 for receiving the transceiver module 600, and a circuit card connector 690. A receptacle 699 is formed from the guide rail assembly 680 and the circuit card connector 690. The guide rail assembly 680 includes rails 681. Additionally, the guide rail assembly 680 includes a hinged, metallic, conductive door 703. The receptacle 699 can also include a faceplate 697 and a ground tab 705. In the field, the circuit card connector 690 and the guide rail assembly 680 are attached to the host device (not shown). Specifically, the guide rail assembly 680 attaches to the circuit card connector 690. Other embodiments of the invention include the multi-port pluggable transceiver or interface converter module 600 having a key which mates with a keyway of the circuit card connector 690. The key and keyway are important since the new multi-port pluggable transceiver 600 having four optical subassemblies with twenty trace contacts may be inserted into an existing GBIC receptacle configured for a GBIC having two optical subassemblies and twenty trace contacts. In such a situation, the host device could be temporarily or permanently disabled. Thus, the key enables the multi-port pluggable transceiver 600 to only be connected to a guide rail assembly 680 connected to a circuit card connector 690 having a keyway. The host device having a keyway is electrically suited to receive the multi-port pluggable transceiver 600. This key/keyway embodiment is just one example of many possible embodiments. As such, the keyed member could be the railing 681 of the receptacle 680 and the keyway could be the rail receiving slot or portion 682 of the module 600. This method of keying the receptacle 697 and module 600 is preferred because mechanical stress associated with attempting to mate mismatched modules and receptacles causes the stress to be transmitted through the frame of the module and not through the electrical connector and electronics of the module. However, keying of the connector or extending the PCB may also be provided.

Furthermore, it should be understood that various changes and modifications to the presently preferred embodiments described herein will be apparent to those skilled in the art. For example, in addition to the configuration of the interface module having two LC duplex ports, the module may have other high density fiber optic plug receptacles such as MT-RJ, MT, VF-45, MAC, MACII, MP or other ribbon type fiber optic connectors. In addition, the present invention may also include a multi-port "copper" (non-optical) transceiver module. For example, the media end of the module may include multiple HSSDC or D-B9 connectors and circuitry therefor. Such changes and modifications may be made without departing from the spirit and scope of the present invention and without diminishing its attendant advantages. It is, therefore, intended that such changes and modifications be covered by the appended claims.

What is claimed is:
1. An optoelectronic device comprising:
 a housing including a base member and a cover, the housing being metallized, the housing having a rail receiving slot engageable with a complimentary rail of a host device, and the housing having a rib receiving slot engageable with a complimentary rib of the host device, the housing having a width dimension being substantially the same as a width dimension of a GBIC, and the housing having a thickness dimension being substantially the same as a thickness dimension of the GBIC;

a printed circuit board mounted within the housing;

an electrical connector attached to the housing, the electrical connector pluggable with a complimentary connector of a host device, the electrical connector being metallized, the electrical connector having a shape of a D-shell, and the electrical connector electrically connected to the housing;

flexible latching members attached to the housing, the flexible latching members configured to engage with cooperating locking structures formed on the host device so as to releasably secure the optoelectronic device to the host device;

a first optical subassembly electrically connected to the printed circuit board, the first optical subassembly includes a first ferrule receiving barrel, and the first optical subassembly is a transmitting device;

a second optical subassembly electrically connected to the printed circuit board, the second optical subassembly includes a second ferrule receiving barrel, and the second optical subassembly is a transmitting device;

a third optical subassembly electrically connected to the printed circuit board, the third optical subassembly includes a third ferrule receiving barrel, and the third optical subassembly is a receiving device;

a fourth optical subassembly electrically connected to the printed circuit board, the fourth optical subassembly includes a fourth ferrule receiving barrel, and the fourth optical subassembly is a receiving device; and an optical connector attached to the housing, the optical connector includes a first port, a second port, a third port, and a fourth port, and wherein the first ferrule receiving barrel of the first optical subassembly being associated with the first port of the optical connector, and wherein the first ferrule receiving barrel of the first optical subassembly is adapted to receive a ferrule of a first fiber optic LC connector, and wherein the first port of the optical connector is adapted to receive the first fiber optic LC connector, and wherein the second ferrule receiving barrel of the second optical subassembly being associated with the second port of the optical connector, and wherein the second ferrule receiving barrel of the second optical subassembly is adapted to receive a ferrule of a second fiber optic LC connector, and wherein the second port of the optical connector is adapted to receive the second fiber optic LC connector, and wherein the third ferrule receiving barrel of the third optical subassembly being associated with the third port of the optical connector, and wherein the third ferrule receiving barrel of the third optical subassembly is adapted to receive a ferrule of a third fiber optic LC connector, and wherein the third port of the optical connector is adapted to receive the third fiber optic LC connector, and wherein the fourth ferrule receiving barrel of the fourth optical subassembly being associated with the fourth port of the optical connector, and wherein the fourth ferrule receiving barrel of the fourth optical subassembly is adapted to receive a ferrule of a fourth fiber optic LC connector, and wherein the fourth port of the optical connector is adapted to receive the fourth fiber optic LC connector, and wherein the printed circuit board includes a contact beam, and wherein the contact beam forms a portion of the electrical connector, the contact beam includes not more than twenty contact fingers, and wherein the contact fingers include ground contact fingers, power contact fingers, and signal contact fingers, wherein an end of each of the ground contact fingers is located a first distance away from an edge of the printed circuit board, and wherein an end of each of the power contact fingers is located a second distance away from the edge of the printed circuit board, and wherein an end of each of the signal contact fingers is located a third distance away from the edge of the printed circuit board, and wherein the second distance is greater than the first distance, and wherein the third distance is greater than the second distance, so as to provide hot plugging.

2. An optoelectronic device and receptacle assembly comprising:

the receptacle includes a rail, a rib, a metallic conductive door and a circuit card connector; and the optoelectronic device includes:

a housing having a rail receiving slot for receiving the rail of the receptacle and a rib receiving slot for receiving the rib of the receptacle, the housing having a width dimension being substantially the same as a width dimension of a GBIC, and the housing having a thickness dimension being substantially the same as a thickness dimension of the GBIC, the housing including a base member and a cover, a printed circuit board mounted within the housing, the printed circuit board having not more than twenty contact fingers, an electrical connector attached to the housing, the electrical connector being pluggable with the circuit card connector of the receptacle, flexible latching members attached to the housing, the flexible latching members configured to engage with cooperating locking structures formed on the receptacle so as to releasably secure the optoelectronic device to the receptacle, a first optical subassembly electrically connected to the printed circuit board, the first optical subassembly includes a first ferrule receiving barrel, a second optical subassembly electrically connected to the printed circuit board, the second optical subassembly includes a second ferrule receiving barrel, a third optical subassembly electrically connected to the printed circuit board, the third optical subassembly includes a third ferrule receiving barrel, a fourth optical subassembly electrically connected to the printed circuit board, the fourth optical subassembly includes a fourth ferrule receiving barrel, and an optical connector attached to the housing, the optical connector includes a first port, a second port, a third port, and a fourth port, and wherein the first ferrule receiving barrel of the first optical subassembly being associated with the first port of the optical connector, and wherein the first ferrule receiving barrel of the first optical subassembly is adapted to receive a ferrule of a first fiber optic LC connector, and wherein the first port of the optical connector is adapted to receive the first fiber optic LC connector, and wherein the second ferrule receiving barrel of the second optical subassembly being associated with the second port of the optical connector, and wherein the second ferrule receiving barrel of the second optical subassembly is adapted to receive a ferrule of a second fiber optic LC connector, and wherein the second port of the optical connector is adapted to receive the second fiber optic LC connector, and wherein the third ferrule receiving barrel of the third optical subassembly being associated with the third port of the optical connector, and wherein the third ferrule receiving barrel of the third optical subassembly is adapted to receive a ferrule of a third fiber optic LC connector, and wherein the third port of the optical connector is adapted to receive the third fiber optic LC connector, and wherein the fourth ferrule receiving barrel of the fourth optical subassembly being associated with the fourth port of the optical connector, and wherein the fourth ferrule receiving barrel of the fourth optical subassembly is adapted to receive a ferrule of a fourth fiber optic LC connector, and wherein the fourth port of the optical connector is adapted to receive the fourth fiber optic LC connector, and wherein the receptacle includes a ground tab, and wherein the optoelectronic device includes an external surface that is metallized and upon insertion of the optoelectronic device within the receptacle, the external surface of the optoelectronic device abuts the ground tab in order to ground the optoelectronic device to the receptacle in order to provide for the harmless dissipation of static charge, and wherein the printed circuit board includes a contact beam, and wherein the contact beam forms a portion of the electrical connector, and wherein the contact fingers include ground contact fingers, power contact fingers, and signal contact fingers, wherein an end of each of the ground contact fingers is located a first distance away from an edge of the printed circuit board, and wherein an end of each of the power contact fingers is located a second distance away from the edge of the printed circuit board, and wherein an end of each of the signal contact fingers is located a third distance away from the edge of the printed circuit board, and wherein the second distance is greater than the first distance, and wherein the third distance is greater than the second distance, so as to provide hot plugging.

\* \* \* \* \*